United States Patent
Kodama et al.

[11] Patent Number: 6,026,486
[45] Date of Patent: Feb. 15, 2000

[54] GENERAL PURPOSE PROCESSOR HAVING A VARIABLE BITWIDTH

[75] Inventors: Hisashi Kodama; Kunitoshi Aono, both of Osaka, Japan

[73] Assignee: Matsushita Electric Industrial Co., Ltd., Osaka, Japan

[21] Appl. No.: 08/859,308

[22] Filed: May 20, 1997

[30] Foreign Application Priority Data

May 23, 1996 [JP] Japan .................................. 8-128046

[51] Int. Cl.[7] .............................. G06F 9/30; G06F 15/16
[52] U.S. Cl. .............................. 712/229; 712/23; 712/24; 712/43; 712/210; 712/215
[58] Field of Search ...................... 395/800.02, 800.22, 395/800.23, 800.24, 800.28, 800.34, 800.41, 800.43, 800.2, 800.32, 200.38, 290, 800.31, 385, 386, 563, 570, 391, 200.31; 712/2, 22–24, 28, 31, 34, 41, 43, 20, 209, 210, 222, 229, 215; 708/503, 570; 345/503; 709/201, 208; 710/110

[56] References Cited

U.S. PATENT DOCUMENTS

| | | | |
|---|---|---|---|
| 4,131,941 | 12/1978 | Siegel et al. | 395/200.38 |
| 5,307,495 | 4/1994 | Seino et al. | 395/676 |
| 5,550,978 | 8/1996 | Takahashi et al. | 395/200.66 |
| 5,758,115 | 5/1998 | Nevill | 712/209 |

OTHER PUBLICATIONS

John P. Hayes, *Computer Architecture and Organization*, McGraw Hill Inc. pp. 259–265, 1988.

*Primary Examiner*—John A. Follansbee
*Attorney, Agent, or Firm*—McDermott, Will & Emery

[57] ABSTRACT

A 32-bit processor control unit receives from a memory an instruction. The control unit then determines whether the received instruction is intended for a 32-bit processor or for a 16-bit processor. If the received instruction is analyzed to be a 32-bit processor instruction, the control unit controls the 32-bit processor with the aid of two 16-bit instruction control units. If the received instruction is a 16-bit processor instruction, the 32-bit processor control unit sends a 16-bit processor mode signal to each of the 16-bit instruction control units. One of the two 16-bit instruction control units controls one of two 16-bit processors which are divisions of the 32-bit processor while the other 16-bit instruction control unit controls the other 16-bit processor. The present invention makes it possible to have a single, wide bitwidth processor serve as a plurality of narrow bitwidth processors depending upon the type of processing. Various operations can be performed in parallel, thereby improving processor performance.

11 Claims, 15 Drawing Sheets

Fig. 6 issue a proc.div 0h00100101 instruction
calculate an address for the next instruction (load 0h05070800 Rb)
save the address in stacks for PC 1401 and PC 1411
write 0h0010 and 0h0101 in PC 1401 and in PC 1411

16-bit processor instruction execution → 16-bit processor instruction execution
16-bit processor instruction execution    16-bit processor instruction execution
..
..                                        proc.con instruction issue
proc.con instruction issue                        nonexecution
fetch the value of PC 1401 and PC 1411 saved from the stacks 32-bit processor instruction execution
..

GENERAL PURPOSE PROCESSOR HAVING A VARIABLE BITWIDTH

BACKGROUND OF THE INVENTION

1. FIELD OF THE INVENTION

The present invention is generally directed to the improvement of processors. More specifically, this invention pertains to a general-purpose processor that is required to perform a variety of operations, wherein a data bitwidth is divided into adequate lengths depending upon the type of processing. By virtue of the ability to make a change in the data bitwidth, the prevention of redundancy can be accomplished, and an extra bitwidth is used in other operations.

2. DESCRIPTION OF THE PRIOR ART

The processing capability of processors has been dramatically improved in recent years. With the improvement, there have been strong demands for high-performance processors capable of performing various types of tasks such as the controlling of various devices and the processing of video/audio signals.

Commonly-used high-performance processors of the above-described type have a great bitwidth, for greater bitwidth performs greater amount of data.

In the multimedia age, the type of data, intended for execution by a single processor, ranges wide from data for use in the processing of audio signals requiring a great bitwidth, to data for use in the processing of video signals requiring a less bitwidth.

Accordingly, the choice of which type of processor to use is based on data that requires the greatest bitwidth. This produces the problem that even data requiring a less bitwidth is processed at a redundant bitwidth (i.e., the greatest bitwidth). In general, 32-bit processors are used in the processing of audio signals when good sound quality is important. On the other hand, 16-bit processors can manage to operate successfully in many cases when used for processing video signals. Further, an 8-bit processor may be sufficient when employed to perform simple control operations. In cases where all of audio signal processing, video signal processing, and simple control operation are carried out in a single processor, both the video signal processing and the simple control operation are indiscriminately performed using a redundant bitwidth, although they can be performed at a less bitwidth.

To cope with the above-described inconvenience, a technique is proposed in which data are pallelized and a plurality of narrow bitwidth data are subjected to simultaneous processing by a wide bitwidth processor, with a view to providing improved processing performance. However, in cases where serial processing, such as condition branch processing, is required to execute, it is impossible to subject a plurality of data to parallelization, resulting in providing no improvements in processor processing performance. On the contrary, use of an expensive processor results in increasing the equipment's entire cost.

A solution for lowering costs may be taken in which an equal number of processors to the number of operations are placed instead of using a single, costly processor, and the bitwidths of the processors are set to suite for their respective operations. This requires both high-performance, inexpensive processors having a wide bitwidth for signal processing and low-price processors having a narrow bitwidth for serial processing. As a result, the number of components increases thereby resulting in an increase in the entire size of equipment.

SUMMARY OF THE INVENTION

Bearing in mind the above-described drawbacks with the prior art techniques, the present invention was made. Accordingly, it is a general object of the present invention to provide a high-performance processor. More specifically, when a single processor is required to perform a plurality of operations, the bitwidth of the processor can be changed to the type of operation.

In order to achieve the object, it is arranged such that a single, wide bitwidth processor (for example, a 32-bit processor) can serve as a plurality of narrow bitwidth processors (two 16-bit processors) as necessity requires.

The present invention provides an improved N-bit the number N is a natural number. This N-bit processor comprises:

(a) an interpretation unit which interprets instructions intended for the N-bit processor, and instructions intended for n Mn-bit processors satisfying N =M1+. . . +Mn where the numbers M1 to Mn are natural numbers and the number n is a natural number equal to or greater than 2;

(b) an instruction control unit for the N-bit processor; when an instruction, interpreted by the interpretation unit, is intended for the N-bit processor, the N-bit instruction control unit controlling the N-bit processor to decode and execute the N-bit processor instruction; and (c) n instruction control units for the n Mn-bit processors; when n instructions, interpreted by the interpretation unit, are intended for the n Mn-bit processors, the N-bit processor being divided into n Mn-bit processors, and the n Mn-bit instruction control units controlling the n Mn-bit processors to decode and execute in parallel the n Mn-bit processor instructions.

The present invention is characterized in that, when an instruction interpreted is intended for the N-bit processor, the N-bit instruction control unit converts the N-bit processor instruction into n Mn-bit format instructions executable by the n Mn-bit processors and provides the n Mn-bit format instructions to the n Mn-bit instruction control units, and the execution of the n Mn-bit format instructions is controlled by the n Mn-bit instruction control units.

The present invention is characterized in that, correspondingly to the n Mn-bit processors, the N-bit processor includes n Mn-bit resources, and when the N-bit processor is divided and serves as the n Mn-bit processors the n Mn-bit instruction control units control the n Mn-bit resources, and when the N-bit processor serves as an N-bit processor, the N-bit instruction control unit controls the n Mn-bit resources to combine together so that the n Mn-bit resources can operate as a single N-bit resource.

The present invention is characterized in that the n Mn-bit resources are Mn-bit arithmetic units placed at n stages and the N-bit instruction control unit includes a data connecting unit which transmits a carry/borrow of an Mn-bit arithmetic unit of the n Mn-bit arithmetic units placed at a stage to another Mn-bit arithmetic unit placed at the next stage to connect together the n Mn-bit control units, when the N-bit processor serves as an N-bit processor.

This invention provides the following advantages. For the case of operations requiring a wide bitwidth, the processor of the present invention serves as a wide bitwidth processor. For the case of operations requiring a less bitwidth, the processor of the present invention serves as a plurality of narrow bitwidth processors. On the other hand, for the case of performing serial processing at a narrow bitwidth, the serial processing, and other processing executable at a narrow bitwidth are carried out in parallel by one of the narrow bitwidth processors and by the remaining processor, respectively. This provides improved processor performance.

BRIEF DESCRIPTION OF THE DRAWINGS

Preferred embodiments of the present invention are described by making reference to the accompanying drawing figures.

FIG. 6 shows a flowchart for processor dividing/connecting instructions in the first embodiment of the present invention.

DETAILED DESCRIPTION OF THE INVENTION

Preferred embodiments of the present invention are now illustrated below by making reference to the accompanying drawing figures.

First Embodiment

Figure 1:
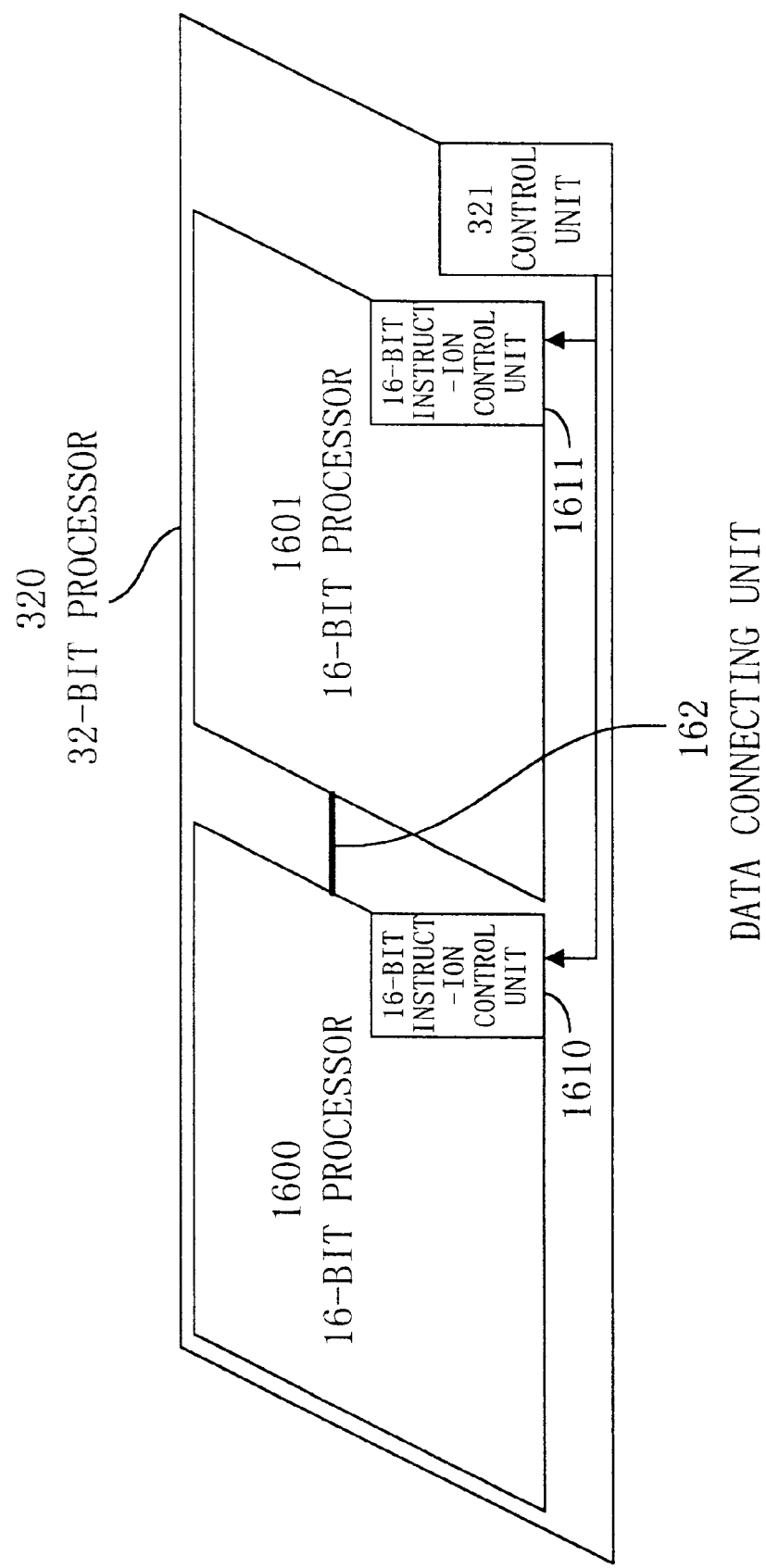
FIG. 1 shows a processor in accordance with a first embodiment of the present invention.

FIG. 1 shows a processor in accordance with a first embodiment of the present invention. 1600 is a 16-bit processor. 1601 is a 16-bit processor. 1610 is an instruction control unit for the 16-bit processor 1600. 1611 is an instruction control unit for the 16-bit processor 1601. Each instruction control unit 1610 and 1611 is an instruction control unit for an Mn-bit processor and is hereinafter referred to as a 16-bit instruction control unit. 320 is a 32-bit processor including the 16-bit processors 1600 and 1601. 321 is a control unit for the 32-bit processor 320.

The 32-bit processor 320 is formed by bit-serial connection of the 16-bit processors 1600 and 1601. The control unit 321 controls resources (components) of the 16-bit processors 1600 and 1601 through the instruction control units 1610 and 1611.

Figure 2:
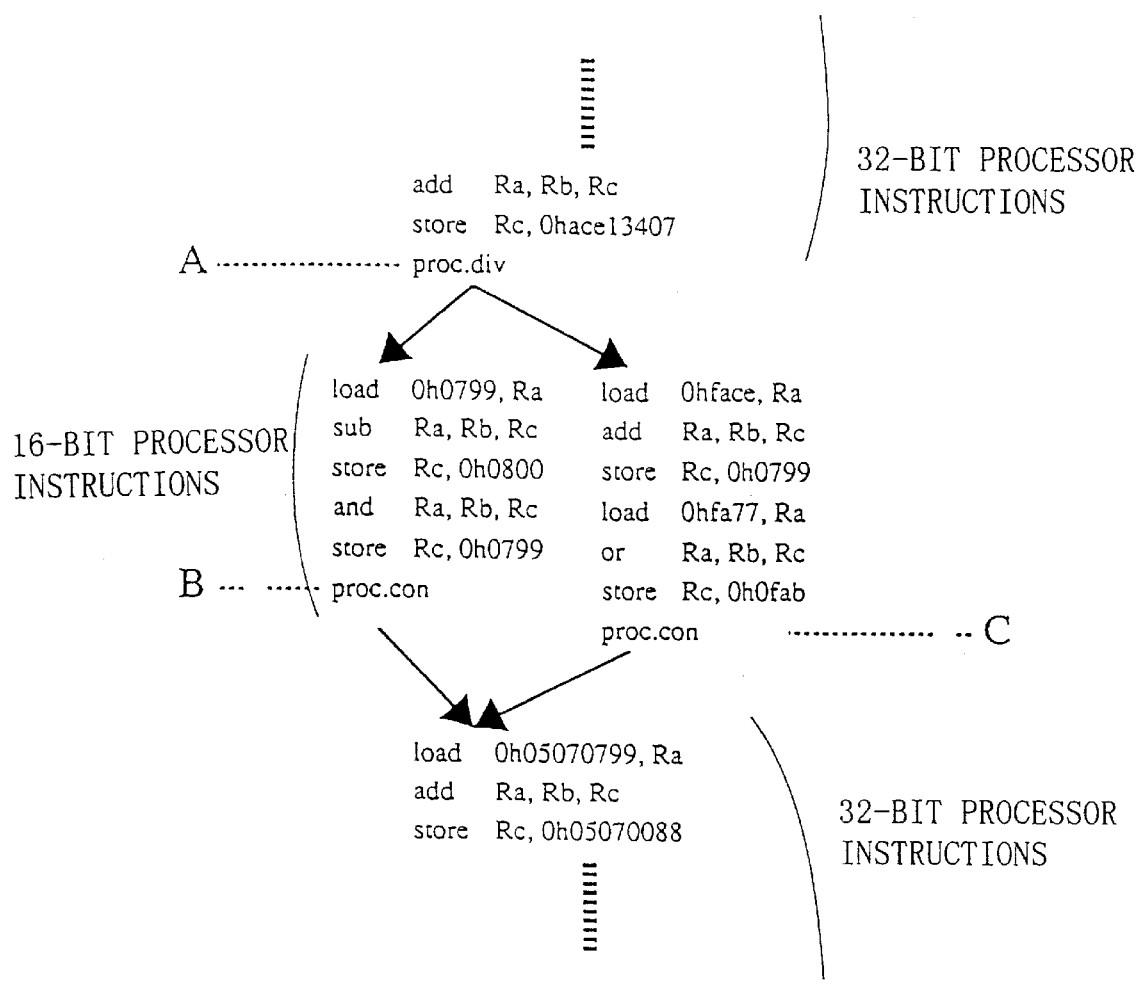
FIG. 2 is a flowchart showing the operation of the processor of the first embodiment of the present invention.

FIG. 2 is a conceptual diagram showing a program execution flow in the processor of FIG. 1. In FIG. 2, the program is sequentially executed from top to bottom. In FIG. 2, the processor of the present embodiment acts as a 32-bit processor at the beginning of the program. A specific instruction, i.e., a processor dividing instruction [proc.div], is executed in the 32-bit processor 320 at point A of FIG. 2. Thereafter, two 16-bit processor instructions are executed, in parallel and independently, in the 16-bit processor 1600 and in the 16-bit processor 1601, respectively.

When one of the 16-bit processors 1600 and 1601, e.g., the 16-bit processor 1600, completes the execution of its operations, the 16-bit processor 1600 issues a specific instruction, i.e., a processor connecting instruction [proc.con], at point B of FIG. 2. Thereafter, this 16-bit processor 1600 either stops operating until the other 16-bit processor 1601 completes the execution of its operations or executes an instruction that will not cause no state transition such as a NOP (no operation) instruction. This [proc.con] instruction may be defined as an instruction to place one 16-bit processor in the wait state until the other 16-bit processor issues the [proc.con] instruction at point C of FIG. 2 after the completion of the execution of the processing. Here, a case, in which a NOP is executed, is described below.

Figure 3:
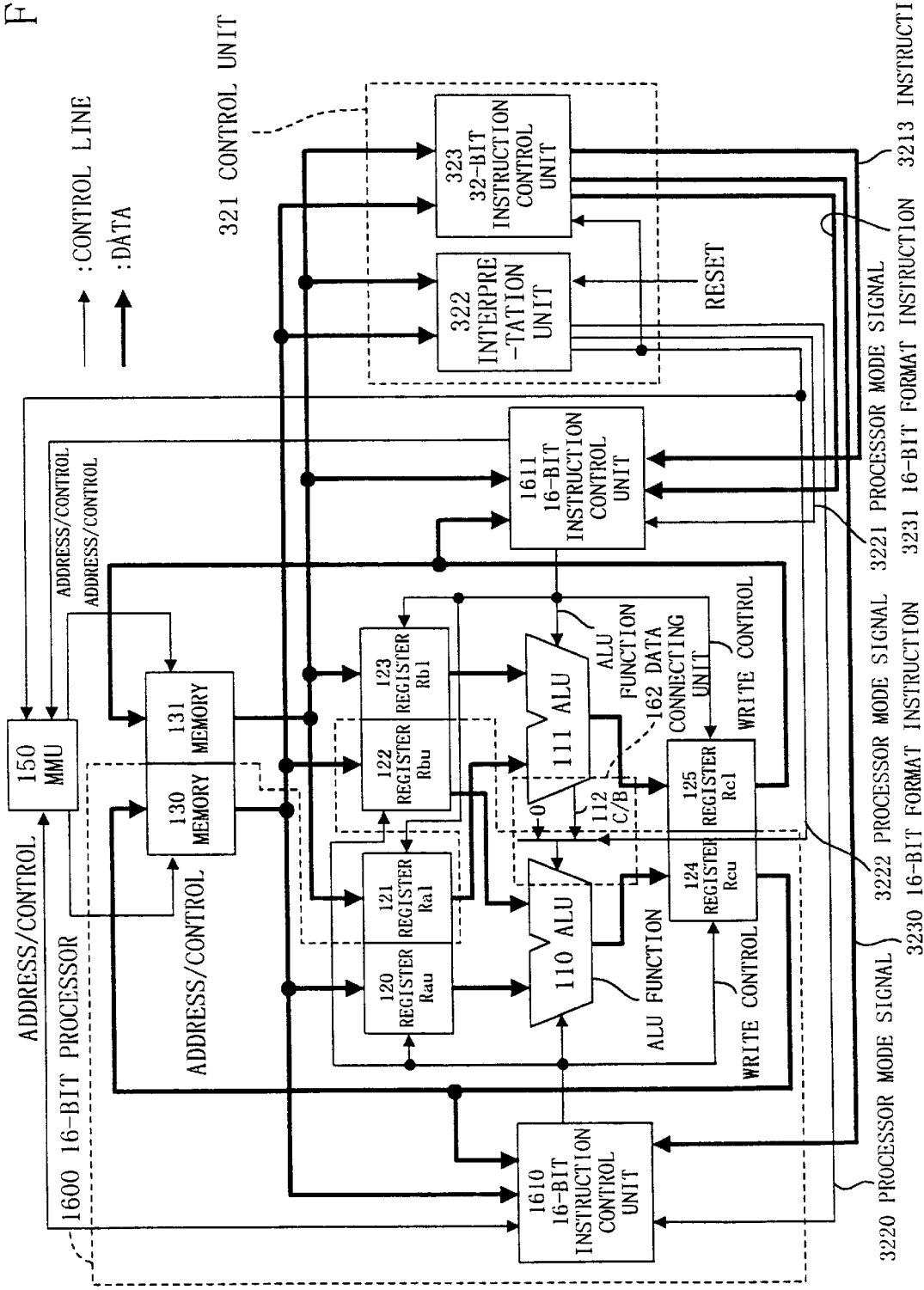
FIG. 3 shows two 16-bit processors together forming the processor of the first embodiment of the present invention.

FIG. 3 shows in detail the processor of the present embodiment. 110 is an arithmetic and logic unit (ALU) (an Mn-bit arithmetic unit) of 16 high-order bits. 111 is another ALU (an Mn-bit arithmetic unit) of 16 low-order bits. 112 is a carry/borrow from the ALU 111 to the ALU 110. 162 is a data connecting unit for the transfer of the carry/borrow 112. 120–125 are 16-bit data registers (Mn-bit data registers). 130 and 131 are 16 (bits)×4 (G words) memories for pre-storing a program shown in FIG. 2. The control unit 321 of the 32-bit processor 320 includes an interpretation unit 322 and a 32-bit instruction control unit 323 (a control unit for the N-bit processor). 150 is a memory management unit (MMU).

Referring to FIG. 3, the 16-bit instruction control units 1610 and 1611 supply to the MMU 150 address/control information for the memories 130 and 131. In response to the address/control information received, the MMU 150 provides the memories 130 and 131 with address/control information.

The interpretation unit 322 of the 32-bit processor 320 interprets whether an instruction that is currently being executed is intended for execution by the 32-bit processor or for execution by the 16-bit processor, thereby providing a processor mode signal 3220, a processor mode signal 3221, and a processor mode signal 3222. The processor mode signal 3220 is applied to the 16-bit instruction control unit 1610, while the processor mode signal 3221 is applied to the 16-bit instruction control unit 1611. The processor mode signal 3222 goes into the 32-bit processor mode only when both the processor mode signals 3220 and 3221 are in the 32-bit processor mode and is applied to the data connecting unit 162.

Figure 13:
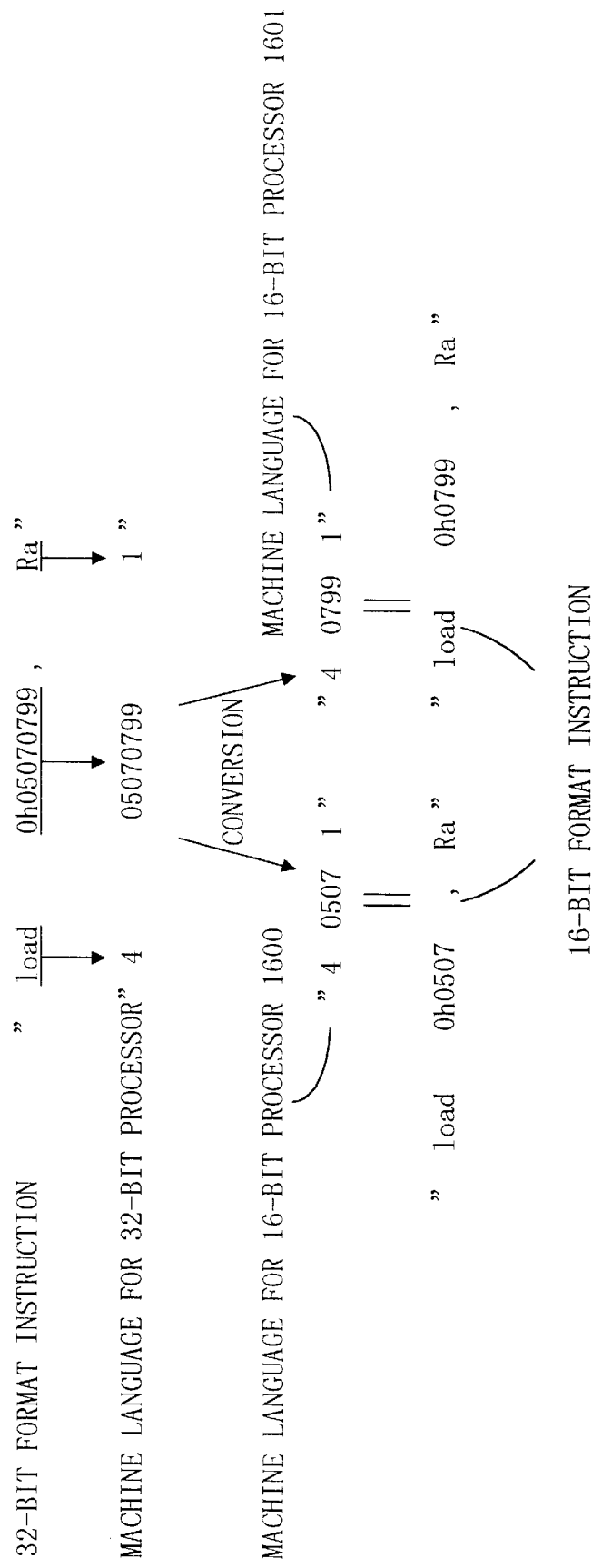
FIG. 13 shows an example useful in understanding the conversion of instructions from 32-bit format into 16-bit format.
Figure 14:
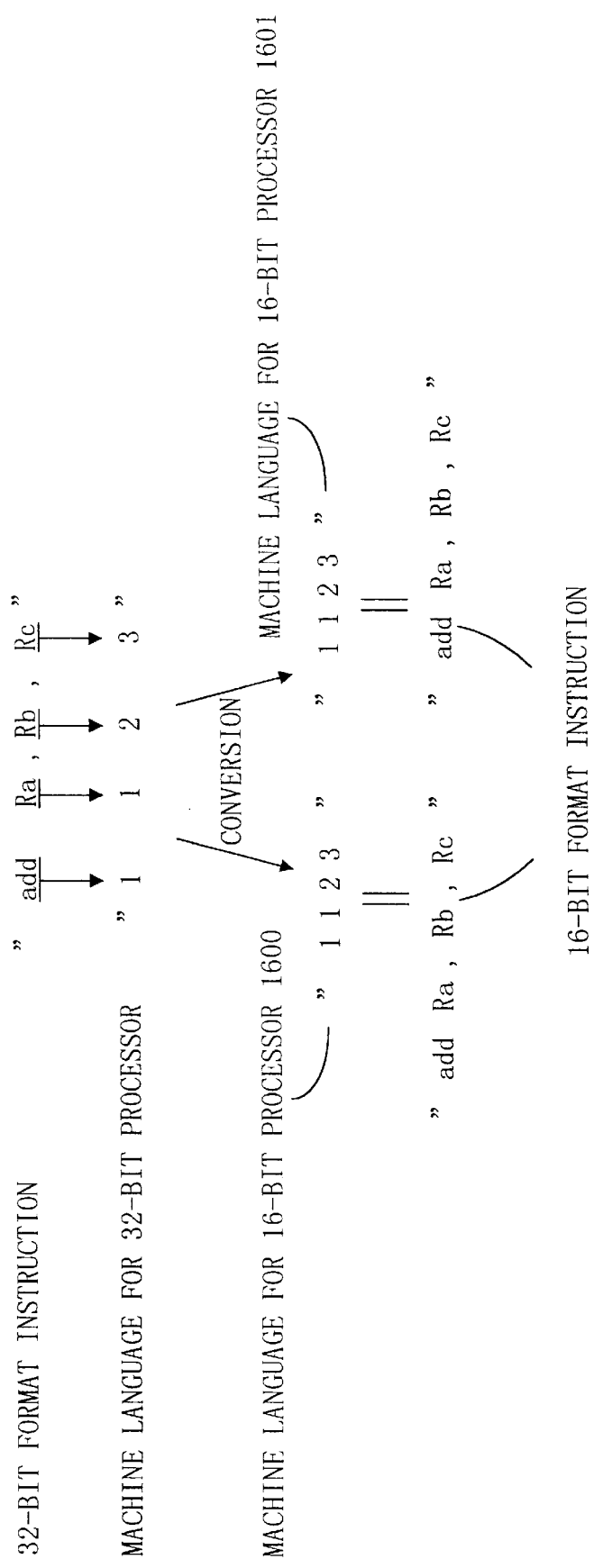
FIG. 14 shows another example.

When the processor mode signal 3222 indicates the 32-bit processor mode, the instruction control unit 323 of the 32-bit processor 320 converts instructions from the memories 130 and 131 into a 16-bit processor instruction format decodable by the 16-bit instruction control units 1610 and 1611. If a uniform instruction format is used between the 32-bit processor and the 16-bit processor and only a data width of an argument is set to a different format, this facilitates the conversion of format. With reference to FIGS. 13 and 14, an example of the conversion of 32-bit processor instruction format into 16-bit processor instruction format is illustrated below.

A 32-bit instruction, [load 0h05070799, Ra], is shown in FIG. 13 as an example of using a memory for the argument. This 32-bit instruction specifies downloading of data at address 0h05070799 of the memory to a register Ra. As shown in FIG. 13, the 32-bit instruction control unit 323 converts [4050707991 (hexadecimal notation)] into [405071] and [407991], thereafter having the two 16-bit processors 1600 and 1601 execute two 16-bit instructions, namely [load 0h0507, Ra] and [load 0h0799, Ra]. Actual addressing to the memories is described later.

As an example of using only a register to the argument, a 32-bit instruction, [add Ra, Rb, Rc], is shown in FIG. 14. This 32-bit instruction specifies execution of an addition operation of Ra+Rb, and the result is stored in a register Rc. As shown in FIG. 14, the 32-bit instruction control unit 323 converts [1123] into [1123] and [1123] (note: in this example, a uniform instruction format is used between the 32-bit processor and the 16-bit processor and, therefore, there is no need to perform a conversion), thereafter having the two 16-bit processors 1600 and 1601 execute two 16-bit instructions, namely [add Ra, Rb, Rc] and [add Ra, Rb, Rc].

When the processor mode signal 3222 indicates the 16-bit processor mode, the 32-bit instruction control unit 323 supplies to the 16-bit instruction control unit 1610 a 16-bit NOP instruction as a 16-bit format instruction 3230 and supplies to the 16-bit instruction control unit 1611 a 16-bit format instruction 3231.

Additionally, the 32-bit instruction control unit 323 supplies to the low-order side instruction control unit 1611 an instruction word length 3213 in the 32-bit processor mode.

Figure 4:
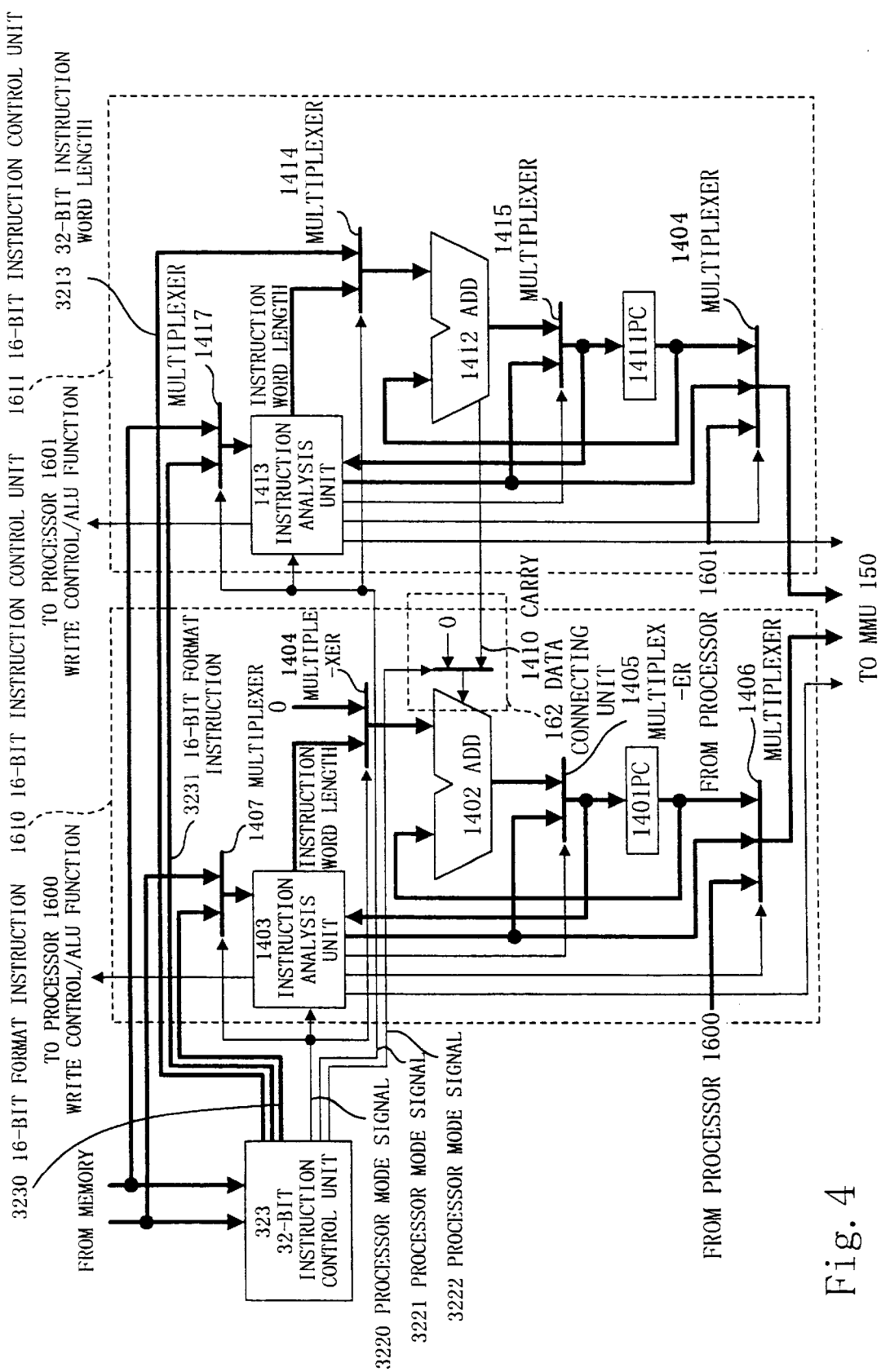
FIG. 4 shows two 16-bit instruction control units of the first embodiment of the present invention.

FIG. 4 shows the 16-bit instruction control unit. When the signals 3220 and 3221 from the unit 323 indicate the 32-bit processor mode, the units 1610 and 1611 analyze instructions from the unit 323, i.e., 16-bit format instructions 3230 and 3231 as a result of converting a 32-bit format instruction into a 16-bit format. On the other hand, when the signals 3220 and 3221 indicate the 16-bit processor mode, the units 1610 and 1611 directly analyze 16-bit format instructions from the memories 130 and 131. In this way, the units 1610 and 1611 control their respective resources: namely the ALU 110, the memory 130, and the registers 120, 122, 124 in the 16-bit processor 1600, and the ALU 111, the memory 131, and the registers 121, 123, 125 in the 16-bit processor 1601.

Figure 15:
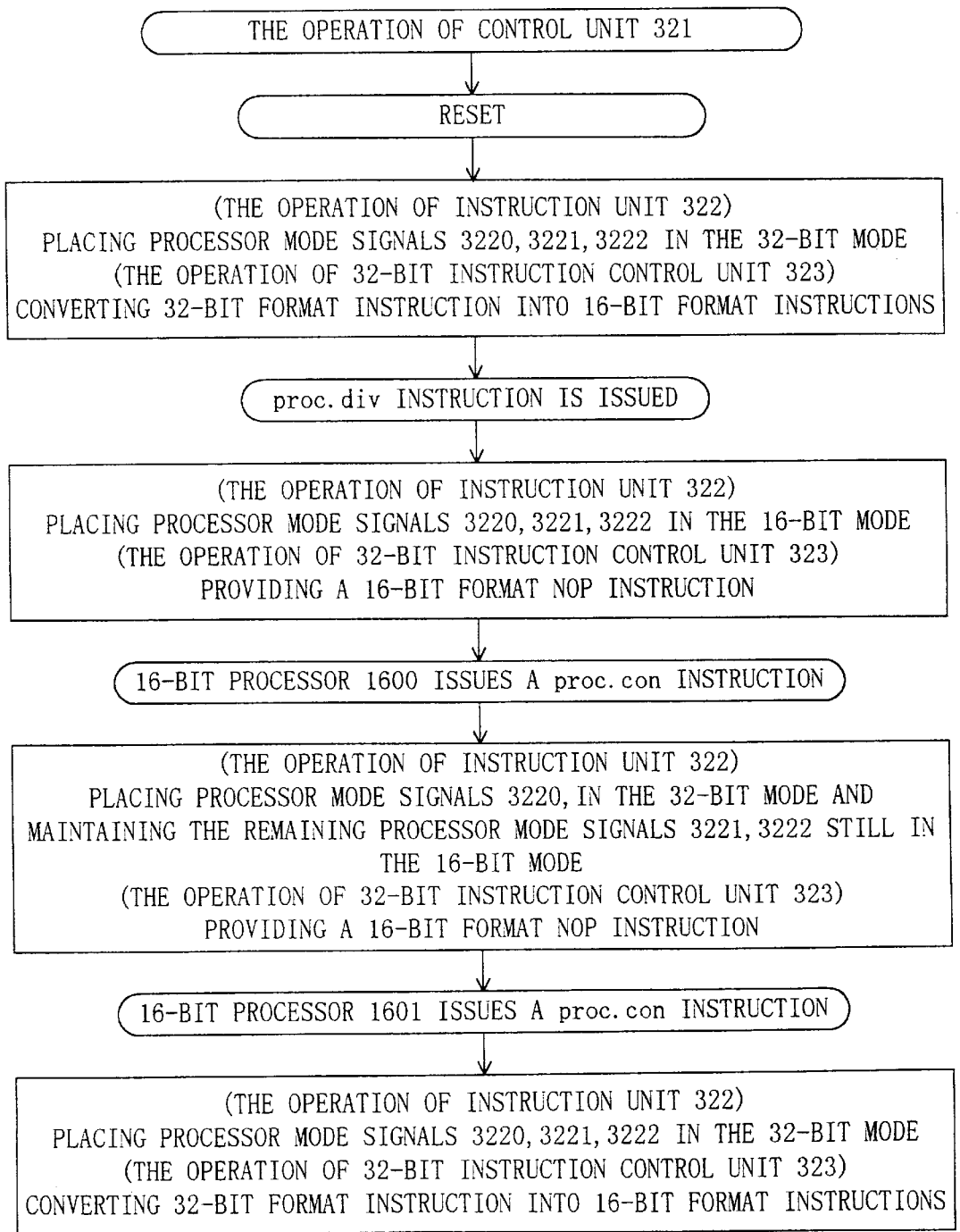
FIG. 15 is a flowchart showing an example of the operation of a 32-bit instruction control unit.

The data connecting unit 162 transfers the carry/borrow 112 from the low-order ALU 111 to the high-order ALU 110 when the received processor mode signal 3222 from the 32-bit instruction control unit 323 indicates the 32-bit processor mode. On the other hand, when the received processor mode signal 3222 indicates the 16-bit processor mode, the data connecting unit 162 selects "0"for forwarding to the high-order ALU 110. A way of how the 32-bit instruction control unit 323 controls the flow of the division/connect of the processor shown in FIG. 2, is described by making reference to FIG. 15.

The 32-bit processor 320 is first reset. As a result, all the processor mode signals 3220, 3221, and 3222 from the interpretation unit 322 come to indicate the 32-bit processor mode. The 32-bit instruction control unit 323 converts 32-bit format instructions from the memories 130 and 131, into 16-bit format instructions 3230 and 3231. The 16-bit instruction control units 1610 and 1611 receive the 16-bit format instructions 3230 and 3231 and have the 16-bit processors 1600 and 1601 execute the received instructions.

When the [proc.div] instruction is issued, the interpretation unit 322 places all the processor mode signals 3220, 3221, 3222 in the 16-bit processor mode. The 32-bit instruction control unit 323 supplies a 16-bit format NOP instruction to each 16-bit instruction control unit 1610 and 1611. However, the 16-bit instruction control units 1610 and 1611 directly analyze 16-bit format instructions from the memories 130 and 131, since the processor mode signals 3220 and 3221 indicate the 16-bit processor mode. These 16-bit format instructions are executed in the 16-bit processors 1600 and 1601.

When the 16-bit processor 1600 issues a [proc.con] instruction at point B of FIG. 2, the interpretation unit 322 places the processor mode signal 3220 for the 16-bit processor 1600 in the 32-bit processor mode. The processor mode signal 3221 for the 16-bit processor 1601 is maintained to be in the 16-bit processor mode. Accordingly, the processor mode signal 3222 is also maintained to be in the 16-bit processor mode. The 32-bit instruction control unit 323 supplies to each of the 16-bit instruction control units 1610 and 1611 a 16-bit format NOP instruction. The 16-bit instruction control unit 1610, which is fed the the [proc. con] instruction from the 32-bit instruction control unit 323, executes the 16-bit format NOP instruction from the 32-bit instruction control unit 323, since the received processor mode signal 3220 indicates the 32-bit processor mode. On the other hand, the 16-bit insurrection control unit 1611 directly analyzes a 16-bit format instruction from a corresponding memory (i.e., the memory 131), since the received processor mode signal 3221 indicates the 16-bit processor mode. This 16-bit format instruction is executed in a corresponding 16-bit processor (i.e., 16-bit processor 1611).

When the 16-bit processor 1601 issues a [proc.con] instruction at point C of FIG. 2, the interpretation unit 322 places the processor mode signal 3221 for the 16-bit instruction control unit 1611 in the 32-bit processor mode. Correspondingly, the processor mode signal 3222 is put in the 32-bit processor mode. The 32-bit instruction control unit 323 converts a 32-bit format instruction from each of the memories 130 and 131 into two 16-bit format instructions, namely the instructions 3230 and 3231. Since the received processor mode signals 3220 and 3221 indicate the 32-bit processor mode, the 16-bit instruction control units 1610 and 1611 receive the 16-bit format instructions 3230 and 3231 from the 32-bit instruction control unit 323, decodes the received instructions, and have the 16-bit processors 1600 and 1601 execute them. The data connection unit 162 transfers the carry/borrow 112 from the low-order ALU 111 to the high-order ALU 110.

As described above, change between 16-bit processor mode and 32-bit processor mode is carried out.

The present embodiment is described using a case in which resetting causes 32-bit processor mode. However, it may be set such that resetting causes 16-bit processor mode.

To sum up, the issue of the [proc.div] instruction allows a single 32-bit processor (the processor 320) to function as two separate 16-bit processors.

In regard to a configuration for generating addresses to the memories 130 and 131, the 16-bit instruction control unit of FIG. 14 is described.

In the present embodiment, addresses 0h00000000 to 0h0000ffff are a storage region allocated to a 16-bit processor, where "0h" indicates that numbers following "0h" are given in hexadecimal. On the other hand, addresses 0h00010000 to 0hffffffff are a storage region allocated to a 32-bit processor.

In FIG. 4, 1401 and 1411 are program counters (Mn-bit program counters). 1402 and 1412 are adders. 1403 and 1413 are instruction analysis units for 16-bit processors. 1410 indicates a carry from the adder 1412 to the adder 1402. 1404, 1414, 1405, 1415, 1406, 1416, 1407, and 1417 are multiplexers.

The 32-bit instruction control unit 323 provides the processor mode signals 3220 and 3221 to the instruction analysis units 1403 and 1413 and to the multiplexers 1404, 1414, 1407 and 1417 in the 16-bit processor. Additionally, the 32-bit instruction control unit 323 provides the 16-bit format instructions 3230 and 3231 in the 32-bit processor mode, to the multiplexers 1407 and 1417. Further, the 32-bit instruction control unit 323 provides the instruction word length 3213 in the 32-bit processor mode, to the multiplexer 1414.

In the 32-bit processor mode, the multiplexers 1407 and 1417 select the 16-bit format instructions 3230 and 3231 from the 32-bit instruction control unit 323 for forwarding to the instruction analysis units 1403 and 1413. On the other hand, in the 16-bit processor mode, the multiplexers 1407 and 1417 select 16-bit format instructions from the memories 130 and 131 for forwarding to the instruction analysis units 1403 and 1413.

In the 32-bit processor mode, the multiplexer 1404 selects a "0" for forwarding to the adder 1402. On the other hand, in the 16-bit processor mode, the multiplexer 1404 selects an instruction word length from the instruction analysis unit 1403 for forwarding to the adder 1402.

In the 32-bit processor mode, the multiplexer 1414 selects the 32-bit format instruction word length 3213 from the 32-bit instruction control unit 323 for forwarding to the adder 1412. On the other hand, in the 16-bit processor mode, the multiplexer 1414 selects an instruction word length from the instruction analysis unit 1413 for forwarding to the adder 1412.

Additionally, the data connecting unit 162 selects a carry from the adder 1412 in the 32-bit processor mode for forwarding to the adder 1402. On the other hand, in the 16-bit processor mode, the data connecting unit 162 selects a "0" for forwarding to the adder 1402.

The instruction analysis units 1403 and 1413 analyze instructions from their respective corresponding multiplexers (i.e., the multiplexers 1407 and 1417), to control the processors' 1600 resources and integrated resources (the multiplexers 1405, 1406, 1415, 1416 and the memories 130 and 131). On the other hand, in the 16-bit processor mode, the instruction analysis units 1403 and 1413 supply 16-bit format instruction word lengths in the 16-bit processor mode to the multiplexers 1404 and 1414.

The instruction analysis units 1403 and 1413 control the multiplexers 1405, 1415, 1406, and 1416. The control of the multiplexers 1405 and 1415 is described. When program branching, such as a branch instruction, a condition branch instruction, a subroutine branch/return instruction, a loop instruction, and a processor dividing instruction, is required, the multiplexers 1405 and 1415 are controlled to select outputs from the instruction analysis units 1403 and 1413 and the selected outputs are supplied to the program counters 1401 and 1411. The control of the multiplexers 1406 and 1416 is described. The multiplexers 1406 and 1416 are controlled to select values from the program counters 1401 and 1411 in a stage of reading instructions from the memories and the selected values are forwarded to the MMU 150. On the other hand, the multiplexers 1406 and 1416 are controlled to select values from the instruction analysis units 1403 and 1413 when instruction execution is being carried out and when address is entered in the program, and the selected values are forwarded to the MMU 150. Further, the multiplexers 1406 and 1416 are controlled to select values from the 16-bit processors 1600 and 1601 in the case of the register indirectness (i.e., when the value stored in the register is used as an address) and the selected values are forwarded to the MMU 150.

The adder 1402 sums together an output from the data connecting unit 162, an output from the multiplexer 1404, and an output form the program counter 1401, and the result of the addition operation is fed to the multiplexer 1405. The adder 1412 sums together an output from the multiplexer 1414 and an output from the program counter 1411, and the result of the addition operation is fed to the multiplexer 1415. In other words, at the time of the 16-bit processor mode, an address for an instruction under analysis (a value of the program counters 1401 and 1411) and a word length for an instruction under analysis are added together, to generate an address for a subsequent instruction. On the other hand, at the time of the 32-bit processor mode, a program counter value (an address for an instruction under analysis) of 32 bits and a word length for an instruction under analysis (the 32-bit format instruction word length 3213) are added together, to generate an address for a subsequent instruction. Of the 32 bits of the program counter value, the high-order half (16 bits) is formed of a value of the program counter 1401 and the low-order half (16 bits) is formed by a value of the program counter 1411.

Figure 5:
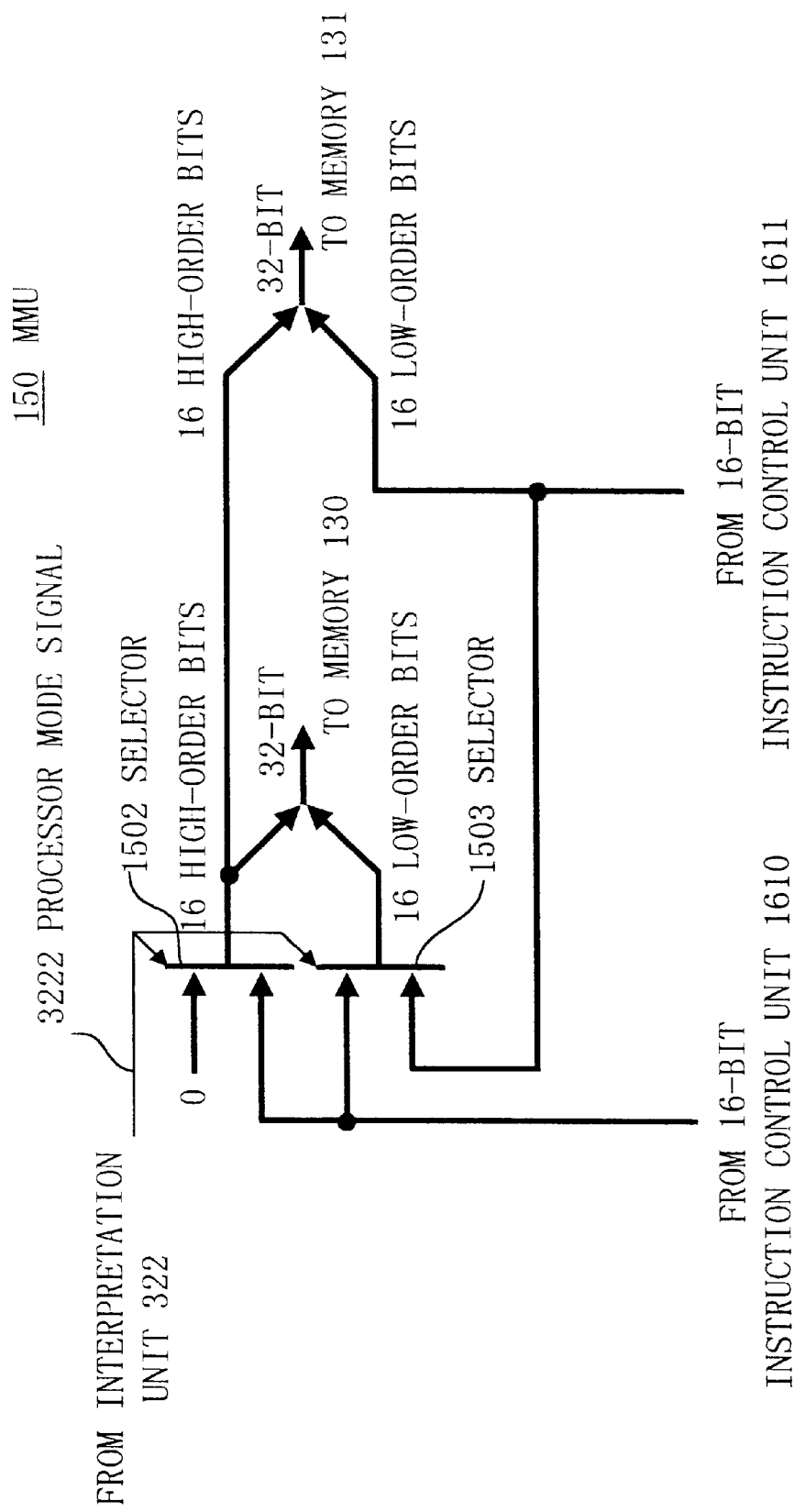
FIG. 5 shows a memory management unit of the first embodiment of the present invention.

FIG. 5 shows an internal configuration of the MMU 150 shown in FIG. 3. The MMU 150 includes two selectors 1502 and 1503. The MMU 150 receives addresses from two 16-bit instruction control units 1610 and 1611, and the processor mode signal 3222 from the interpretation unit 322.

In the MMU 150, the selector 1502 selects an address from the high-order side 16-bit instruction control unit 1610 and provides the selected address, in the 32-bit processor mode. On the other hand, in the 16-bit processor mode, the selector 1502 selects a "0" and provides it. The selector 1503 selects an address from the low-order side 16-bit instruction control unit 1611 and provides the selected address, in the 32-bit processor mode. On the other hand, in the 16-bit processor mode, the selector 1503 selects an address from the 16-bit instruction control unit 1610 and provides the selected address. An address for the memory 130 is generated from an output from the selector 1502 and an output from the selector 1503 in which the former output serves as the high-order half (16 bits) of the address and the latter output serves as the low-order half (16 bits) of the address. On the other hand, an address for the memory 131 is generated from an output from the selector 1502 and an address from the low-order side 16-bit processor 1611 in which the former output serves as the high-order half (16 bits) of the address and the latter output serves as the low-order half (16 bits) of the address.

Figure 8:
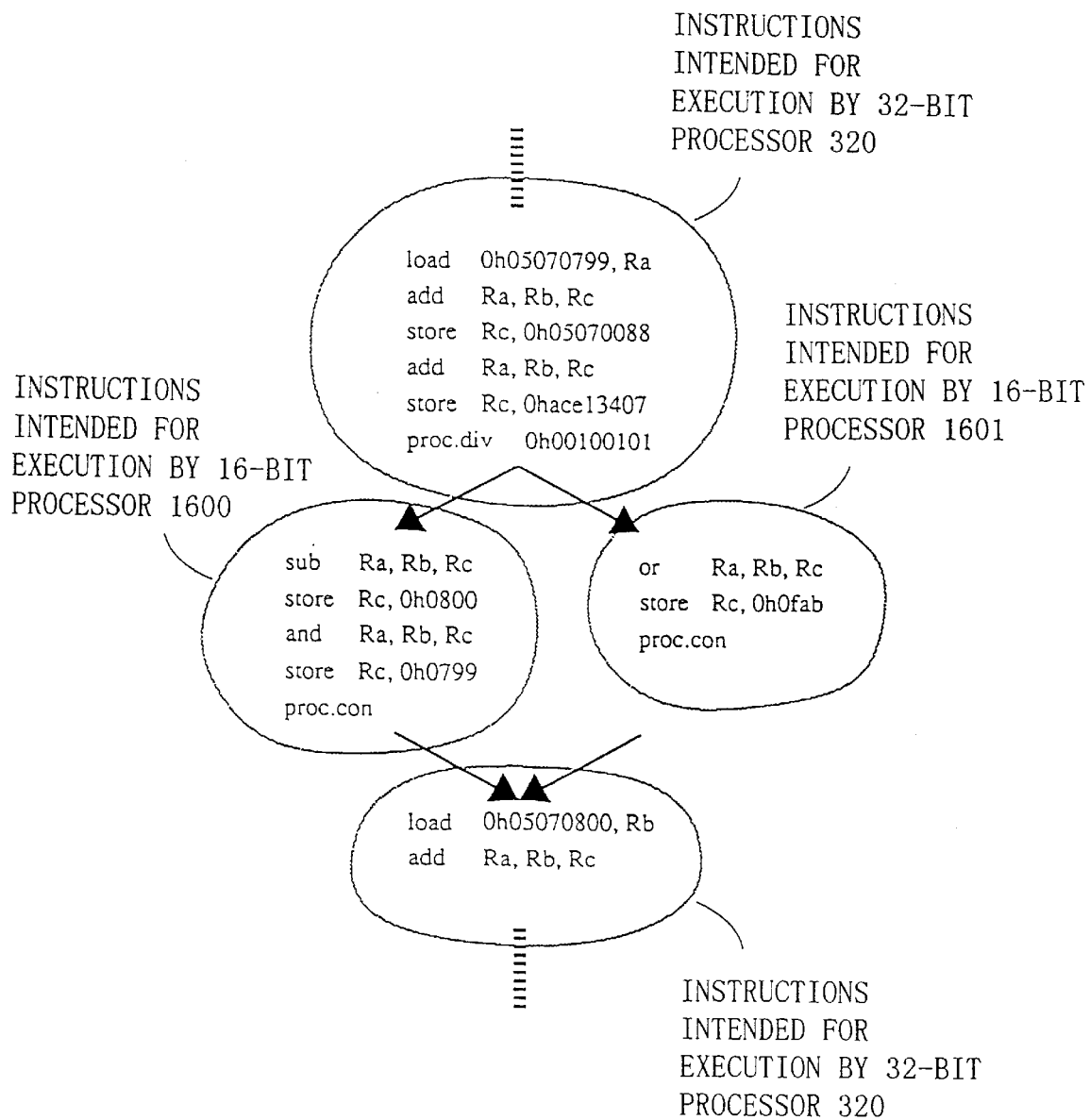
FIG. 8 shows a program flow in the first embodiment of the present invention.

FIGS. 6 and 8 show the operations of the processor of the present invention for dividing/connecting instructions. When the 32-bit processor instruction program continues, and when a 32-bit format processor dividing instruction [proc.div 0h00100101] is issued, calculations are performed to find an address for an instruction of [load 0h05070800, Rb] that is executed after the instruction [proc.div 0h00100101] (i.e., an instruction that is executed first when the 32-bit processor mode recurs after the post-processor division 16-bit processor mode). This calculated address is saved in a stack. Thereafter, 16 high-order bits of an argument of the dividing instruction are written into the program counter 1401 and 16 low-order bits of the argument are written into the program counter 1411.

When a transition to the 16-bit processor mode is made, the 16-bit processors 1600 and 1601 branch to an address of [0h00000010] and to an address of [0h00000101], respectively and operate independently to perform respective operations. When the 16-bit processors 1600 and 1601 complete their respective operations and issue a processor connecting instruction (a [proc.con] instruction), the foregoing address saved at the stack, which is an address for a 32-bit processor instruction that is executed next, is stored in the program counter for returning to the execution of 32-bit processor instructions.

Figure 7:
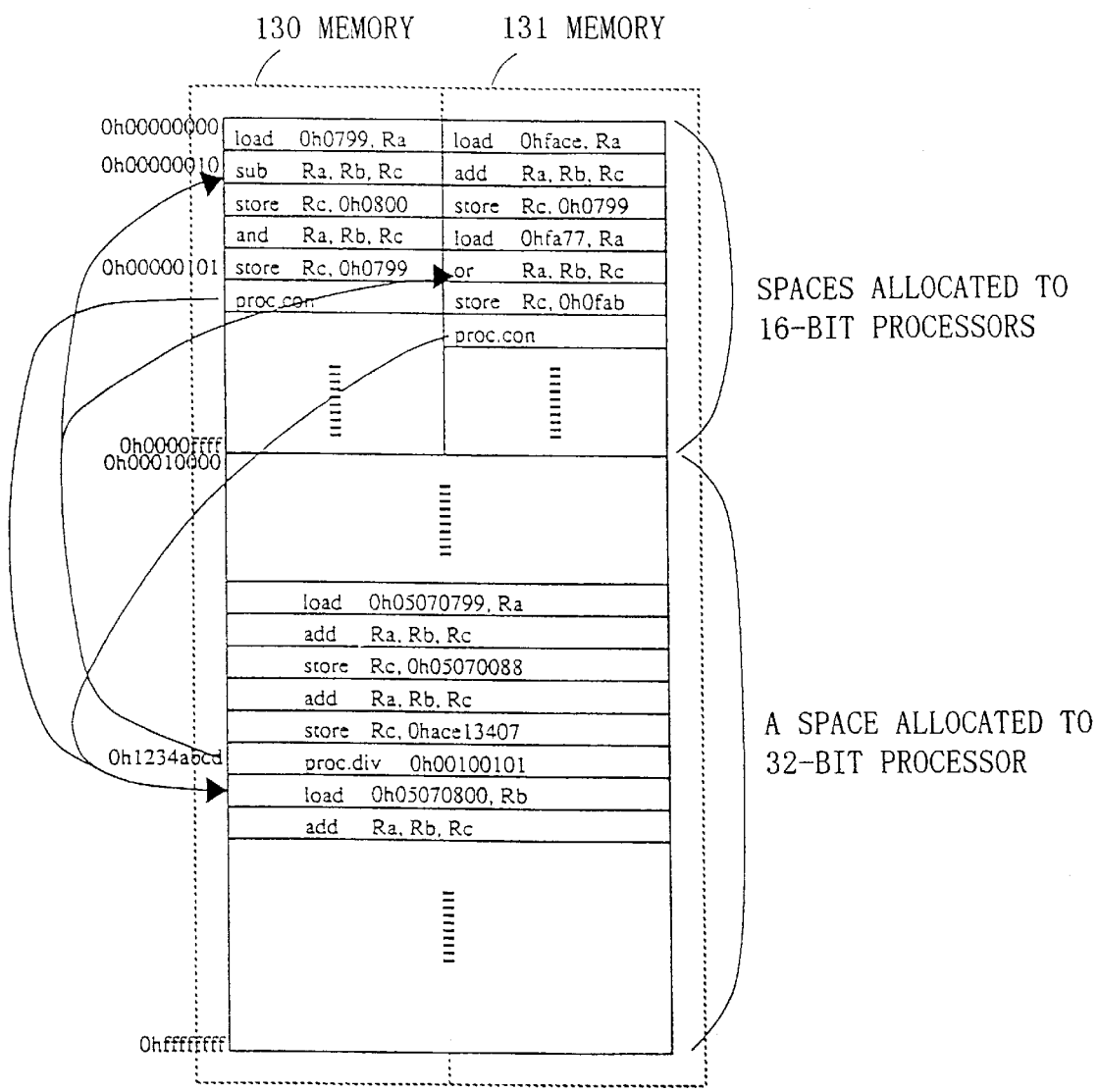
FIG. 7 shows allocation of addresses in memories of the processor of the first embodiment of the present invention.

FIG. 7 shows allocation of addresses of the memories 130 and 131 in the present embodiment. The flow of the program is shown by arrow. The flow of the program of the present embodiment is shown in time series manner.

Second Embodiment

A second embodiment of the present invention is now described. One modification of the configuration for generating addresses of the memories 130 and 131 is shown in the present embodiment.

In accordance with the first embodiment, a 16-bit processor is allowed to use a storage region ranging from address [0h00000000] to address [0h0000ffff] at the time of the 16-bit processor mode. This produces the problem that it is impossible to perform a 16-bit processor mode operation that requires a greater address region than the above address region. The present invention provides a solution to such a problem. Additionally, when the address region from [0h00000000] to address [0h0000ffff] is sufficient enough to perform a certain 16-bit processor mode operation, the present embodiment provides the advantage that the latitude of program region allocation is increased.

Figure 9:
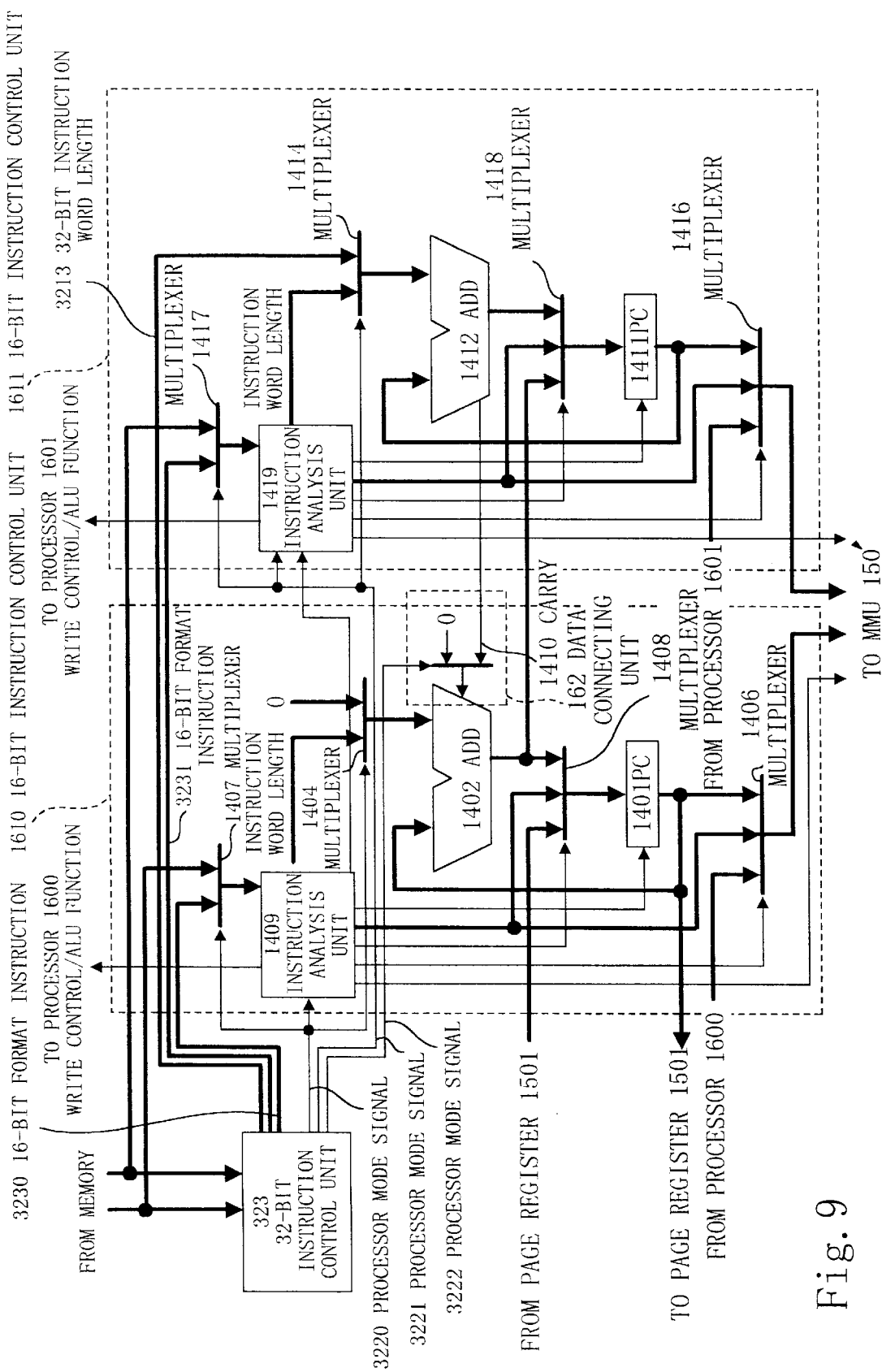
FIG. 9 shows two 16-bit instruction control units in a second embodiment of the present invention.

With reference to FIG. 9, the organisation of the 16-bit instruction control unit 1610 and the organisation of 16-bit instruction control unit 1611 are described. 1401 and 1411 are program counters. 1402 and 1412 are adders. 1409 and 1419 are instruction analysis units for use in 16-bit processors. 1410 indicates a carry from the adder 1412 to the adder 1402.

The 32-bit instruction control unit 323, the multiplexers 1407, 1417, 1404, 1414, and the data connecting unit 162 shown in FIG. 9 are identical in structure and operation with the 32-bit instruction control unit 323, the multiplexers 1407, 1417, 1404, 1414, and the data connecting unit 162 shown in FIG. 4.

The instruction analysis units 1409 and 1419 analyze instructions from the multiplexers 1407 and 1417 and control resources of the 16-bit processors 1600 and 1601, the multiplexers 1408, 1406, 1418, 1416, and the memories 130 and 131. Additionally, at the time of the 16-bit processor mode, the instruction analysis units 1409 and 1419 supply to the multiplexers 1404 and 1414 word lengths of the instructions.

When the 16-bit processor 1600 issues a processor connecting instruction (a [proc.connect] instruction), the instruction analysis unit 1409 of the 16-bit instruction control unit 1610 informs the instruction analysis unit 1419 of the 16-bit instruction control unit 1611 of the issue of the [proc.connect] instruction by the 16-bit processor 1600. The instruction analysis unit 1409 controls the multiplexer 1408 as follows. When program branching, such as a branch instruction, a condition branch instruction, a subroutine branch/return instruction and a loop instruction), is required, the multiplexer 1408 is controlled to select an output from the instruction analysis unit 1409 for forwarding to the program counter 1401. For the case of a processor connecting instruction ([proc.con, proc.connect]), the multiplexer 1408 is controlled to select a value from a page register 1501 which is described later for forwarding to the program counter 1401. In other situations, the multiplexer 1408 is controlled to select an output from the adder 1402 for forwarding to the program counter 1401. Additionally, for the case of a processor dividing instruction (a [proc.div] instruction), the program counter 1401 is reset.

The instruction analysis unit 1419 of the other 16-bit processor 1601 controls the multiplexer 1418 in the following way. When program branching is required, the multiplexer 1418 is controlled to select an output from the instruction analysis unit 1419 for forwarding to the program counter 1411. When the 16-bit processor 1600 issues a processor connecting instruction (a [proc.connect] instruction), the multiplexer 1418 is controlled to select a value from the adder 1402 for forwarding to the program counter 1411. In other situations, the multiplexer 1418 is controlled to select an output from the adder 1412 for forwarding to the program counter 1411. Additionally, for the case of a processor dividing instruction (a [proc.div] instruction), the program counter 1411 is reset.

The control of the multiplexers 1406 and 1416 of FIG. 9 is the same as the control of the multiplexers 1406 and 1416 of FIG. 4. The adder 1402 of FIG. 9 operates in the same way as the adder 1402 of FIG. 4.

Figure 10:
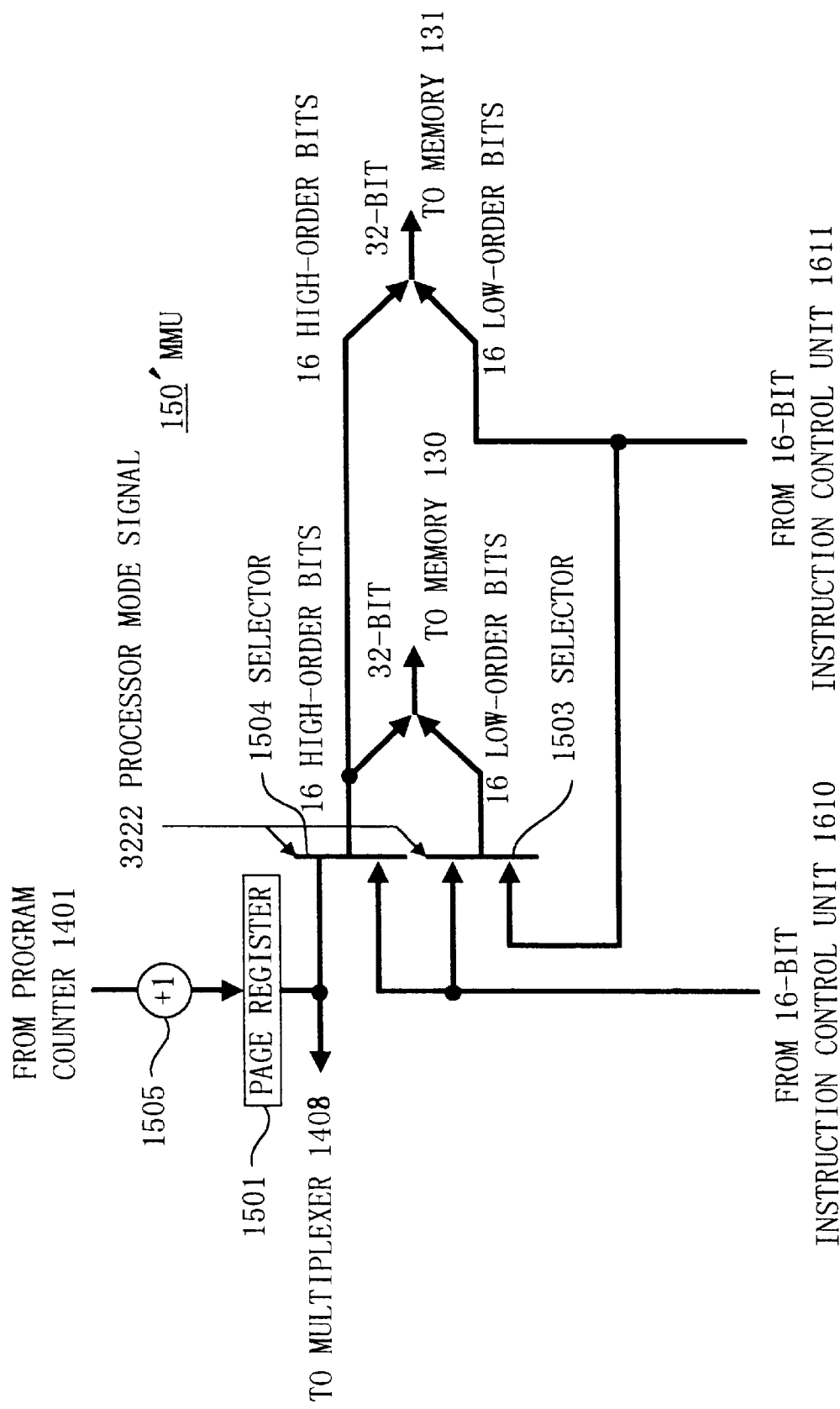
FIG. 10 shows a memory management unit of the second embodiment of the present invention.

Referring now to FIG. 10, an MMU 150' of the present embodiment is described. The MMU 150' includes selectors 1503 and 1504, the foregoing 16-bit page register 1501, and a +1 adder 1505. Addresses from the 16-bit instruction control units 1610 and 1611, an output from the program counter 1401 of the 16-bit instruction control unit 1610, and the processor mode signal 3222 from the 32-bit instruction control unit 323 are all fed the MMU 150'.

In the MMU 150' shown in FIG. 10, the selector 1504 selects an address from the 16-bit instruction control unit 1610 in the 32-bit processor mode determined from the processor mode signal 3222 and provides the selected address. On the other hand, in the 16-bit processor mode, the selector 1504 selects a value from the page register 1501 and provides the selected value. The selector 1503 selects an address from the 16-bit instruction control unit 1611 in the 32-bit processor mode and provides the selected address. On the other hand, in the 16-bit processor mode, the selector 1503 selects an address from the 16-bit instruction control unit 1610 and provides the selected address. An address for the memory 130 is generated from an output from the selector 1504 and an output from the selector 1503 in which the former output serves as 16 high-order bits of the address and the latter output serves as 16 low-order bits of the address. On the other hand, an address for the memory 131 is generated from an output from the selector 1504 and an address from the low-order side 16-bit processor 1611 in which the output serves as 16 high-order bits of the address and the address from the processor 1611 serves as 16 low-order bits of the address.

Figure 11:
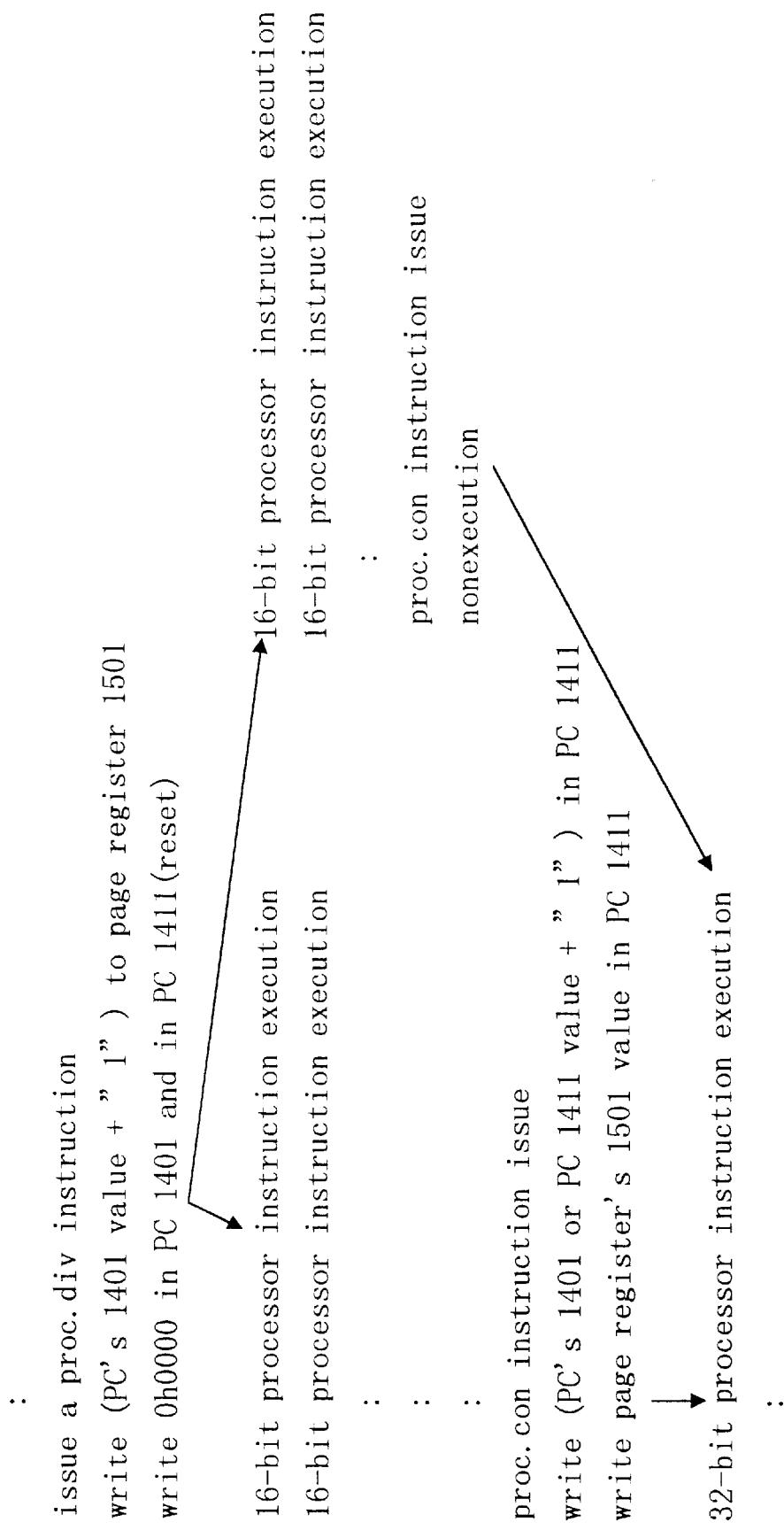
FIG. 11 shows a flowchart for processor dividing/connecting instructions in the second embodiment of the present invention.
Figure 12:
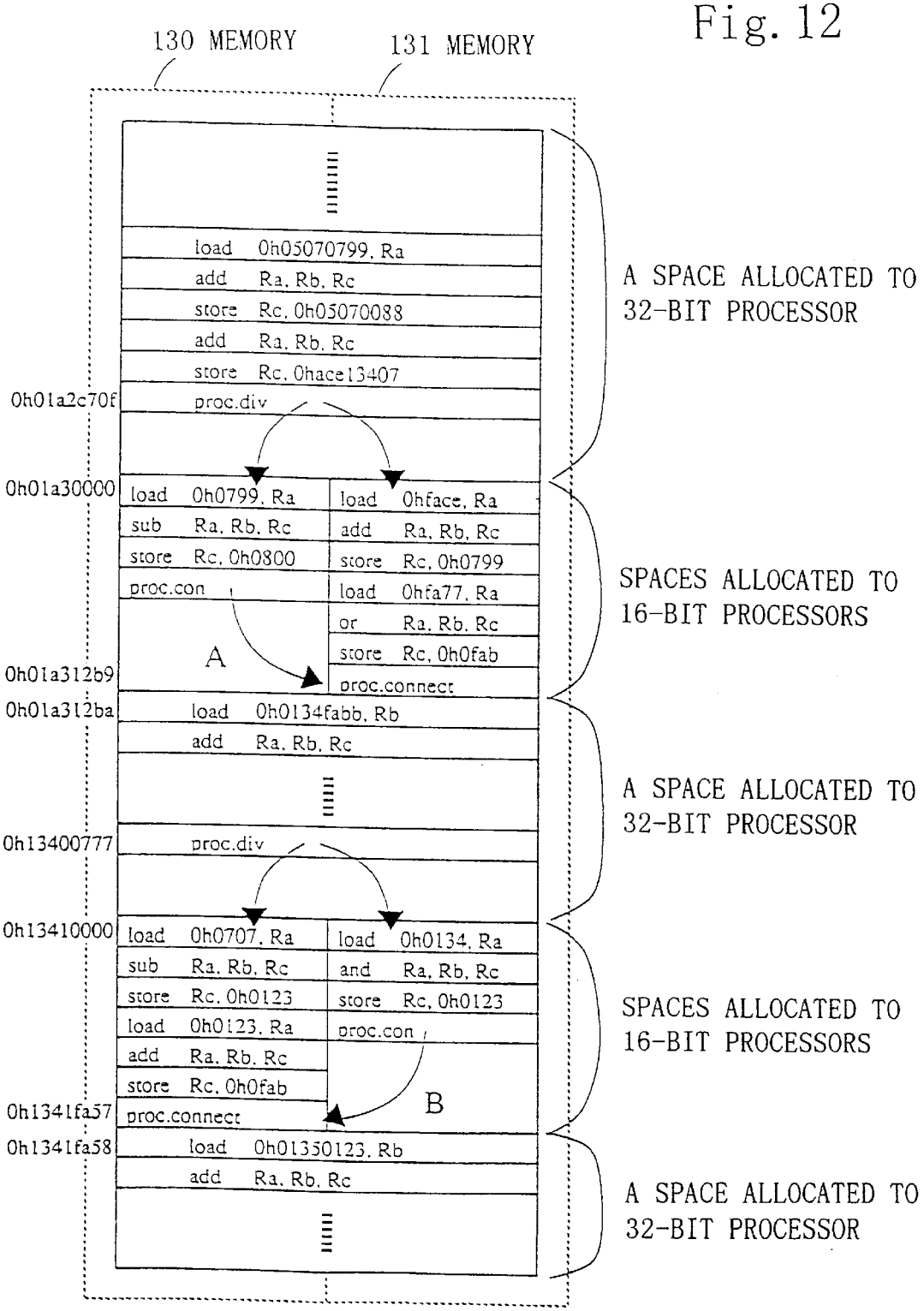
FIG. 12 shows allocation of addresses in memories of the processor of the second embodiment of the present invention.

FIG. 11 shows the operations of the processor of the present invention for processor dividing/connecting instructions. FIG. 12 shows allocation of addresses of the memories 130 and 131. The flow of the program is indicated by arrow.

When the 32-bit processor instruction program continues, and when a processor dividing instruction (a [proc.div] instruction which is stored at address [0h01a2c70f] or at address [0h13400777] of FIG. 12) is issued (see FIG. 11), "1" is added by the +1 adder 1505 to a value of the program counter 1401. The result ([0h01a3] or [0h13411]) is written into the page register 1501 and "0" is written into each program counter 1401 and 1411.

When a transition to the 16-bit processor mode is made, the 16-bit processors 1600 and 1601 branch to an address of [0h01a30000] and to an address of [0h13410000], respectively and operate independently to execute their respective 16-bit format instructions.

The 16-bit processors 1600 and 1601 each issue a processor connecting instruction at the completion of the execution of their respective operations. These processor connecting instructions issued by the processors 1600 and 1601 are discriminated from each other as follows. A processor connecting instruction, issued from the 16-bit processor 1600 or the 16-bit processor 1601, whichever uses a greater storage region than the other, is called a [proc.connect] instruction. On the other hand, a processor connecting instruction, issued from the 16-bit processor 1600 or the 16-bit processor 1601, whichever uses a less storage region than the other, is called a [proc.con] instruction. The instruction word length of the [proc.connect] instruction ("1" in the present invention) is added to the value of the program counter of the 16-bit processor which issued the [proc.connect] instruction (the program counter 1411 in the case of A of FIG. 12 or the program counter 1401 in the case of B), the result is stored in the program counter 1411, and the value of the page register 1501 is stored in the program counter 1401, for returning to the execution of 32-bit processor instructions.

It is to be noted that, at the time of the 16-bit processor mode, 16 low-order bits of an address may not be allowed to use a region of [0hffff]. The reasons is that addition of "1" to [0hffff] causes a carry to the high-order half (16 bits) of the address. As a result, it becomes necessary to add "1" to the value of the page register 1501.

In the above description, a plurality of instructions stored in the memories 130 and 131 are made variable in length so that these stored instructions have different lengths; however, they may be arranged to have a fixed length. When using a fixed instruction word length, the instruction word length 3213 from the 32-bit instruction control unit 323 can be omitted.

The present invention makes it possible to distinguish between the use of a wide bitwidth processor and the use of a plurality of narrow bitwidth processors. For the case of operations requiring a wide bitwidth, the processor of the present invention is used as a wide bitwidth processor. On the other hand, for the case of performing serial processing at a narrow bitwidth, the serial processing and other processing executable at a narrow bitwidth are carried out in parallel by one of the narrow bitwidth processors and by the remaining processor, respectively. This provides improved processor performance.

The invention claimed is:

1. An N-bit processor where the number N is a natural number, comprising:
   (a) an interpretation unit which interprets instructions intended for said N-bit processor, and instructions intended for n Mn-bit processors satisfying N=M1+ . . . +Mn where the numbers M1 to Mn are natural numbers and the number n is a natural number equal to or greater than 2;
   (b) an instruction control unit for said N-bit processor;
   when an instruction, interpreted by said interpretation unit, is intended for said N-bit processor, said N-bit instruction control unit controlling said N-bit processor to decode and execute said N-bit processor instruction; and
   (c) n instruction control units for said n Mn-bit processors;
   when n instructions, interpreted by said interpretation unit, are intended for said n Mn-bit processors, said N-bit processor being divided into n Mn-bit processors and said n Mn-bit instruction control units controlling said n Mn-bit processors to decode and execute in parallel said n Mn-bit processor instructions, wherein:
      said N-bit processor includes a memory which stores instructions intended for said N-bit processor, instructions intended for said n Mn-bit processors, and specific instructions; and
      said interpretation unit receives said three types of instructions from said memory and decodes a specific instruction included in said received instructions to determine whether instructions following said specific instruction are intended for said N-bit processor or for said n Mn-bit processors.

2. An N-bit processor according to claim 1 wherein said specific instruction is a processor dividing instruction and wherein said interpretation unit forms a judgement that instructions following said processor dividing instruction are intended for said n Mn-bit processors, in response to said processor dividing instruction.

3. An N-bit processor according to claim 2, wherein:
   said N-bit processor includes n program counters for said n Mn-bit processors;
   said processor dividing instruction is an N-bit format instruction; and
   said processor dividing instruction specifies operations of:
      calculating an address for an N-bit processor instruction that is executed first after said processor dividing instruction;
      saving a result of said calculation; and
      writing an N-bit address contained in said processor dividing instruction by Mn bits into said n Mn-bit program counters.

4. An N-bit processor according to claim 3 wherein said specific instruction includes also a processor connecting instruction and wherein said processor connect instruction specifies operations of stopping said N-bit processor from serving as said n Mn-bit processors to restore a value of said N-bit program counter saved at the time of executing said processor dividing instruction.

5. An N-bit processor according to claim 2,
   wherein:
      said N-bit processor includes n program counters for said n Mn-bit processors and an (N−Mn)-bit page register; and
      said processor dividing instruction specifies operations of:
         adding "1" to an (N−Mn)-th bit from the highest-order bit of a program counter value for said processor dividing instruction;
         writing into said (N−Mn)-bit page register a result of said addition operation which is the value of said high-order (N−Mn)-th bit; and
         writing "0" into said n program counters.

6. An N-bit processor according to claim 5 wherein, when said N-bit processor serves as said n Mn-bit processors, each of said n Mn-bit instruction control units provides, to a memory for prestoring instructions, an address of N bits wherein the high-order half of said N-bit address is a value from said (N−Mn)-bit page register and the low-order half of said N-bit address is an Mn-bit address at the value of "0" from a corresponding program counter thereto.

7. An N-bit processor according to claim 6, wherein:
said specific instruction includes a processor connecting instruction which is issued, when each of said Mn-bit processors completes its operations, from a corresponding Mn-bit instruction control unit; and
when any of said n Mn-bit processors completes its operations thereby causing a corresponding Mn-bit instruction control unit to issue said processor connecting instruction, said Mn-bit instruction control unit controls said Mn-bit processor either to stop operating until the remaining Mn-bit processors complete their respective operations or to execute an instruction causing no state transitions.

8. An N-bit processor according to claim 7 wherein, when all of said n Mn-bit processors complete their respective operations, an address of N bits is fed to a memory for prestoring instructions wherein the high-order half of said N-bit address is a value of said (N−Mn)-bit page register and the low-order half of said N-bit address is a value formed by adding "1" to a value of a corresponding program counter to an Mn-bit instruction control unit which last provides a processor connecting instruction.

9. An N-bit processor according to claim 1 wherein said specific instruction is a processor connecting instruction and wherein said interpretation unit forms a judgement that an instructions following said processor connecting instruction is intended for said N-bit processor, in response to said processor connecting instruction.

10. An N-bit processor where the number N is a natural number, comprising:
(a) an interpretation unit which interprets instructions intended for said N-bit processor, and instructions intended for n Mn-bit processors satisfying N=M1+ . . . +Mn where the numbers M1 to Mn are natural numbers and the number n is a natural number equal to or greater than 2;
(b) an instruction control unit for said N-bit processor;
when an instruction, interpreted by said interpretation unit, is intended for said N-bit processor, said N-bit instruction control unit controlling said N-bit processor to decode and execute said N-bit processor instruction; and
(c) n instruction control units for said n Mn-bit processors;
when n instructions, interpreted by said interpretation unit, are intended for said n Mn-bit processors, said N-bit processor being divided into n Mn-bit processors and said n Mn-bit instruction control units controlling said n Mn-bit processors to decode and execute in parallel said n Mn-bit processor instructions
wherein, when an instruction interpreted is intended for said N-bit processor, said N-bit instruction control unit converts said N-bit processor instruction into n Mn-bit format instructions executable by said n Mn-bit processors and provides said n Mn-bit format instructions to said n Mn-bit instruction controls units, and wherein the execution of said n Mn-bit format instructions is controlled by said n Mn-bit instruction control units.

11. An N-bit processor where the number N is a natural number, comprising:
(a) an interpretation unit which interprets instructions intended for said N-bit processor, and instructions intended for n Mn-bit processors satisfying N=M1+ . . . +Mn where the numbers M1 to Mn are natural numbers and the number n is a natural number equal to or greater than 2;
(b) an instruction control unit for said N-bit processor;
when an instruction, interpreted by said interpretation unit, is intended for said N-bit processor, said N-bit instruction control unit controlling said N-bit processor to decode and execute said N-bit processor instruction; and
(c) n instruction control units for said n Mn-bit processors;
when n instructions, interpreted by said interpretation unit, are intended for said n Mn-bit processors, said N-bit processor being divided into n Mn-bit processors and said n Mn-bit instruction control units controlling said n Mn-bit processors to decode and execute in parallel said n Mn-bit processor instructions
wherein:
said N-bit processor induces a memory with a storage region for storing instructions intended for said N-bit processor and instructions intended for said n Mn-bit processors;
a space of said storage region of said memory designated by addresses "O" to (2^Mnmax−1) is allocated to said n Mn-bit processors, where ^ indicates the exponent and Mnmax indicates the greatest of M1, M2, . . . , and Mn; and
a space of said storage region of said memory designated by addresses (2^Mnmax) to (2^N−1) is allocated to said N-bit processor.

* * * * *